US006785338B1

(12) United States Patent
Reitmeier et al.

(10) Patent No.: US 6,785,338 B1
(45) Date of Patent: Aug. 31, 2004

(54) CONSTRAINING VIDEO PRODUCTION BASED ON COMPRESSION-RELATED INFORMATION

(75) Inventors: Glenn Arthur Reitmeier, Yardley, PA (US); Robert Norman Hurst, Jr., Hopewell, NJ (US); Terrence Raymond Smith, Westmont, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/484,928

(22) Filed: Jan. 18, 2000

Related U.S. Application Data
(60) Provisional application No. 60/116,402, filed on Jan. 19, 1999.

(51) Int. Cl.$^7$ .................................................. H04N 7/12
(52) U.S. Cl. .................................................. 375/240.29
(58) Field of Search ................................ 348/419, 405, 348/400, 414, 406; 375/240.02, 240.03, 245, 240.14, 240.29; 382/238, 236, 232

(56) References Cited

U.S. PATENT DOCUMENTS

| | | | | |
|---|---|---|---|---|
| 5,467,402 A | * | 11/1995 | Okuyama et al. | ........... 382/104 |
| 5,640,208 A | * | 6/1997 | Fujinami | ............... 375/240.14 |
| 5,802,240 A | | 9/1998 | Asai | .............................. 386/52 |
| 6,122,400 A | * | 9/2000 | Reitmeier | ................... 382/166 |
| 6,154,771 A | * | 11/2000 | Rangan et al. | ............... 709/217 |
| 6,263,020 B1 | * | 7/2001 | Gardos et al. | ......... 375/240.03 |
| 6,356,945 B1 | * | 3/2002 | Shaw et al. | .................. 709/231 |
| 2001/0046298 A1 | * | 11/2001 | Terada et al. | ............... 380/252 |

FOREIGN PATENT DOCUMENTS

| | | | | |
|---|---|---|---|---|
| EP | 0 875 856 A1 | 11/1998 | ............. G06T/7/00 |
| WO | WO 95/35628 | 12/1995 | ............ H04N/7/26 |
| WO | WO 97/19562 | 5/1997 | ............ H04N/7/58 |
| WO | WO 97/39577 | 10/1997 | ............ H04N/7/01 |

* cited by examiner

Primary Examiner—Chris Kelley
Assistant Examiner—Behrooz Senfi
(74) Attorney, Agent, or Firm—William J. Burke, Esq.

(57) ABSTRACT

Compression-related information is used to constrain the selection and control of video imagery and content used to produce one or more uncompressed video streams for subsequent compression processing. Rather than taking an uncompressed video stream "as is" for compression processing, characteristics of compression processing are taken into consideration during the video production stage when the uncompressed video stream is generated. Different types of constraints include "intra-frame" constraints that constrain video content within a frame of a video stream, "inter-frame" constraints that constrain video content from frame to frame within a video stream, and "inter-stream" constraints that constrain video content across different video streams. Two or more different constraints and two or more different types of constraints may be applied simultaneously. The compression-related information may be "static" (e.g., in the form of processing "rules" that are applied) or fed back in real time from the video compression stage as "dynamic" information. By taking the subsequent compression processing into account during the video production stage, the resulting uncompressed video stream(s) can be encoded (e.g., to achieve more programs per channel and/or higher quality per program) using computationally inexpensive "objective" video compression algorithms that operate without taking video content into consideration, while still achieving the bit rate and video quality levels achieved using computationally expensive "subjective" video compression algorithms that do take video content into consideration.

35 Claims, 3 Drawing Sheets

CONSTRAINING VIDEO PRODUCTION BASED ON COMPRESSION-RELATED INFORMATION

CROSS-REFERENCE TO RELATED APPLICATIONS

This application claims the benefit of the filing date of U.S. provisional application No. 60/116,402, filed on Jan. 19, 1999.

BACKGROUND OF THE INVENTION

1. Field of the Invention

The present invention relates to video production and compression processing.

2. Description of the Related Art

Traditional video compression processing applies an "objective" video encoding algorithm to an incoming video stream. An objective video encoding algorithm proceeds without taking into account the content of the video stream being encoded. For example, the encoding algorithm may divide the video stream into 16-frame groups of pictures (GOPs), where the first frame in each GOP is encoded as an intra (I) frame (i.e., a frame encoded using only intra-frame encoding techniques without reference to any other frames) and the remaining (i.e., subsequent) 15 frames in the GOP are encoded using inter-frame encoding techniques (e.g., as predicted (P) frames or bi-directional (B) frames).

Such objective video encoding can lead to inefficiencies. For example, if the first frame in a GOP happens to correspond to the last frame in a particular scene in the video sequence, then the inter-frame encoding techniques used to encode the subsequent 15 frames (which correspond to the next scene in the video sequence) may either (1) poorly encode those frames (i.e., produce low quality in the video playback) or (2) require many bits to encode or (3) both.

Some prior art video compression schemes apply a "subjective" video encoding algorithm that does take the content of the incoming video stream into account during video compression processing. For example, a subjective encoding algorithm may, either automatically or with the assistance of a human operator, be able to take the location of certain scene changes into account when defining GOPs in the video stream. For the example described earlier, such a video encoding algorithm may extend the previous GOP by one frame to include the last frame in the old scene and then start the next GOP with the first frame in the new scene. As a result, the second GOP will likely be encoded at higher quality using fewer bits.

This ability to extend or shorten GOPs by a frame or two can be used to address problems caused by abrupt scene changes that occur within a few frames of a transition between "normal" GOPs during video compression processing. The usefulness of this capability however is limited to those particular situations. Other situations, such as scene changes that occur in the middle of GOPs and/or gradual—rather than abrupt—scene changes, might not be addressed by such subjective video encoding algorithms.

SUMMARY OF THE INVENTION

As described earlier, both objective and subjective video compression schemes take an incoming video stream "as is." Objective compression schemes process the incoming video stream "blindly," that is, without taking into account any knowledge of the video content. Subjective compression schemes, on the other hand, use knowledge of the video content (e.g., the location of scene changes) to adapt the video encoding processing based on the video content to improve encoding efficiency (e.g., video quality and/or bit rate). In both objective and subjective video compression schemes, however, video production, during which the incoming video stream for the video compression stage is generated, operates in an "open loop" manner, that is, without any regard to the subsequent video compression processing.

The present invention, on the other hand, is directed to video production that takes subsequent video compression processing into account. In particular, information about the video compression stage is used to constrain processing and scene content during the video production stage. Depending on the implementation, that information may include one or more static inputs to the video production stage and/or one or more dynamic inputs fed back from the video compression stage in real time. To the extent that information regarding the subsequent video compression processing is input into the earlier video production processing, the present invention may be said to be directed to "closed loop" video production, where the video production processing takes subsequent video compression processing into account.

According to one embodiment, the present invention is a method for producing an uncompressed video stream, comprising the steps of (a) receiving one or more sets of video imagery; and (b) generating the uncompressed video stream from the one or more sets of video imagery, wherein selection of content in the uncompressed video stream is constrained based on information relating to potential subsequent video compression processing.

According to another embodiment, the present invention is a video processing system, comprising (1) a video production stage and (2) a video compression stage. The video production stage is configured to (a) receive one or more sets of video imagery; and (b) generate the uncompressed video stream from the one or more sets of video imagery, wherein selection of content in the uncompressed video stream is constrained based on information relating to potential subsequent video compression processing. The video compression stage is configured to apply the video compression processing to the uncompressed video stream to generate an encoded video bitstream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
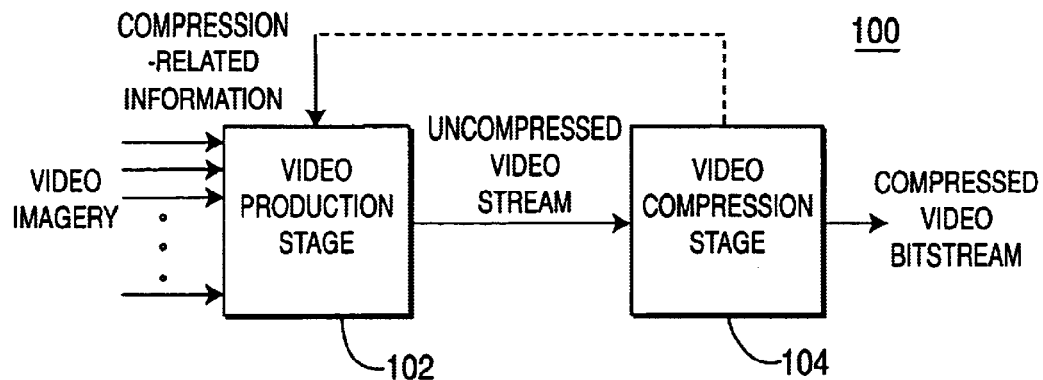
FIG. 1 is a block diagram of a generic video processing system, according to one embodiment of the present invention.

FIG. 1 is a block diagram of a generic video processing system 100, according to one embodiment of the present invention. System 100 comprises two basic processing stages: a video production stage 102 and a video compression stage 104. Production stage 102 receives one or more sets of video imagery (e.g., moving video sequences, still images, graphics) and generates an uncompressed video stream that is compressed in compression stage 104 to generate a corresponding compressed video bitstream. As used in this specification, the term "video production" refers to steps involving the selection and control of the video content that goes into the uncompressed video stream. As such, video production includes video editing in which segments from two or more existing video streams are combined to form the uncompressed video stream.

As shown in FIG. 1, according to the present invention, in addition to the different sets of video imagery, production stage 102 also receives compression-related information that is used to constrain video production, that is, constrain the selection and control of how the different sets of video imagery are included in the resulting uncompressed video stream. The broken portion of the line in FIG. 1 from compression stage 104 back to production stage 102 is intended to indicate that at least some of the compression-related information input to production stage 102 may be—but does not have to be—"dynamic" information that is generated during compression stage 104 and fed back to production stage 102, perhaps in real time. Alternatively or in addition, some of the compression-related information may be "static" information that is input to production stage 102, where the static information is dependent on the compression processing of compression stage 104 in general, but independent of the compression processing of compression stage 104 for the particular uncompressed video stream currently being compressed. The present invention may be implemented in the context of any suitable video compression algorithm, including those conforming to the MPEG family of video compression standards.

The types of compression-related information and the corresponding types of constraints applied during video production processing for the present invention can vary from application to application. The different types of video production constraints can be generically categorized as: (1) intra-frame constraints, (2) inter-frame constraints, and (3) inter-stream constraints. Intra-frame constraints refer to those constraints that affect the selection and control of video content within a given frame of a given video stream. Inter-frame constraints refer to those constraints that affect the selection and control of video content from frame to frame within a given video stream. And inter-stream constraints refer to those constraints that affect the selection and control of video content across multiple streams, for example, in applications where two or more compressed video bitstreams are transmitted over a single transmission channel. The compression-related information that drives those constraints will also typically differ from type to type. A particular video production stage, such as production stage 102 of FIG. 1, may receive one or more different types of compression-related information and apply one or more different corresponding types of production constraints during video production processing.

The following sections provide one or more examples of each of these different types of video production constraints.
Intra-Frame Production Constraints In typical video encoding algorithms, such as the MPEG algorithms, each video frame is divided into blocks of pixels, and various video compression techniques (such as motion estimation, motion compensation, spatial frequency transformation (e.g., discrete cosine transformation (DCT)), quantization, run-length encoding, and/or variable-length encoding) are then applied on a block-by-block basis to the data in those pixel blocks. According to possible implementations of the present invention, information relating to the size and location of pixel blocks that will be used during video compression processing is used to constrain video production processing. The following paragraphs describe examples of how that block information can be used to constrain video production processing.

A wipe is a particular type of gradual scene change from a previous scene to a subsequent scene in which part of each frame in the wipe corresponds to imagery from the previous scene and the rest of the frame corresponds to imagery from the subsequent scene. As the wipe progresses from frame to frame, the amount of imagery from the previous scene decreases, while the amount of imagery from the subsequent scene increases until, at the end of the wipe, all of the imagery is from the subsequent scene. One type of wipe is a vertical wipe in which a vertical boundary (which separates the portion of the current frame based on imagery from the previous scene from the portion of the current frame based on imagery from the subsequent scene) in each frame of the wipe moves from left to right or from right to left from frame to frame during the wipe. In a horizontal wipe, an analogous horizontal boundary moves from top to bottom or from bottom to top from frame to frame during the wipe. Another type of wipe is the "telescoping" wipe, where the portion of each frame during the wipe that is based on imagery from either the previous scene or the subsequent scene corresponds to an "insert" or "window" in the video frame that either shrinks or grows from frame to frame during the wipe. In this case, the wipe boundary is defined by a rectangle in each frame. Yet another type of wipe is the "dissolve" or "checkerboard" wipe in which different (e.g., random) individual regions of each frame come from the previous and subsequent scenes.

According to possible implementations of the present invention, the size and location of blocks used during video compression processing are taken into account during video production processing to constrain the characteristics of wipes in the resulting uncompressed video stream. In particular, during vertical and horizontal wipes, the location of the wipe boundary line in each frame is constrained to ensure that, in each frame of the wipe, the wipe boundary coincides with pixel block boundaries used during video compression processing. Similarly, during "telescoping" wipes, the rectangular boundary is constrained to coincide with pixel block boundaries, such that, in each frame during the wipe, the video insert is defined by an increasing or decreasing integer number of pixel blocks. Similarly, during "dissolve" or "checkerboard" wipes, the individual regions of each frame coming from the previous and subsequent scenes are constrained to correspond to integer numbers of pixel blocks.

By constraining video content during these different types of wipes to correspond to block boundaries, each block of pixel data in each frame during a wipe will necessarily come from only a single source of video imagery (i.e., either the previous scene or the subsequent scene). As a result, during the compression stage, the various compression techniques will always be applied to blocks of pixel data, where each block comes from a single video source. This increases the chances that those blocks will be encoded efficiently compared to prior art schemes in which individual blocks of pixel data may correspond to different sources of video imagery.

Wipes are not the only instance where the size and location of pixel blocks can be taken into account during video production processing. In many video applications, two or more sets of video imagery are combined together in a "static" manner to form composite frames, where the portion of each frame from each set of video imagery remains constant for a relatively large number of frames (as opposed to the "dynamic" nature of wipes, where the portion of each frame from each of two sets of video imagery varies from frame to frame during the wipe). This static type of video production results in a composite video stream where different portions of each frame correspond to different sets of video imagery displayed concurrently. Examples of composite video streams include (a) two or more motion video streams running concurrently as in a split screen or picture-in-a-picture application, (b) motion video with a still image insert, or vice versa, and (c) a motion video stream with a graphics panel, for example, for closed captioning, stock prices, sports scores, or news headlines.

According to possible implementations of the present invention, knowledge of the size and location of pixel blocks used during video compression processing is used to constrain the locations of boundaries between different sets of video imagery within each composite frame. For example, graphics panels running along the bottom of a video stream would be constrained during production processing to having a height corresponding to an integer number of pixel blocks. Video inserts, whether corresponding to motion video, still image, or graphics data, would have horizontal and vertical dimensions constrained to be equal to integer numbers of corresponding block dimensions. Moreover, those video inserts would be constrained during production processing to coincide with block boundaries. Here, too, compression efficiencies are achieved, since each block of video data corresponds to a single set of video imagery.

The uncompressed video streams generated during video production processing that is constrained based on block size and location would result in more efficient objective video compression processing, since each block of video pixel data subjected to the various compression techniques would be guaranteed to correspond to a single set of video imagery.

Constraining the video content of wipes and composite images based on pixel blocks provides just two examples of intra-frame video production constraints that are supported by the present invention. Other types of intra-frame video production constraints based on other types of compression-related information are also possible, such as limiting the size of motion video windows to reduce bit rate.

The production constraints described in this section are intra-frame constraints that are applied to select and control video content within a frame of a video stream. The next two sections describe inter-frame production constraints that are applied to select and control video content from frame to frame within a given video stream.

Inter-Frame Production Constraints

Another application for the present invention relates to pans, which occur when the video imagery shifts in a particular direction, such as that resulting from a video camera moving with respect to the scene being recorded. Pans can also be implemented during video production processing by steadily changing the portion of a particular set of video imagery that is included in the resulting uncompressed video stream. According to possible implementations of the present invention, the rate and direction of a pan are constrained to coincide with block dimensions, such that each successive frame adds an integer number of blocks of video imagery to one side of the video frame and removes the same integer number of blocks of video imagery from the other side of the video frame. A more general and less restrictive constraint would limit pans to adding and subtracting m blocks of video imagery with every n successive frames, where m and n are both integers that may be the same or different. In that case, the amount of imagery added and subtracted between every pair of frames might not coincide with integer numbers of blocks, but that would be true for every set of n frames.

Similarly, zooms are video effects where the apparent magnification of video imagery is either increased or decreased without changing the overall dimensions of the display. When zooming in, video imagery at the outer edges of the video content is removed, while video imagery at the outer edges is added to the video content when zooming out. According to possible implementations of the present invention, the rate and focal point of such zooming in or out is constrained such that the amount of video imagery removed or added from the video content corresponds to integer numbers of pixel blocks, either for every frame or for every set of n frames during the zoom.

Although the previous discussion has been directed to pans and zooms, it will be understood that the present invention could be used for many other types of video effects, such as a push (i.e., a transition in which the new scene "slides over" the old scene or "pushes out" the old scene).

Although the previous discussion has been directed to block-based production constraints, alternative or additional production constraints can be applied at the levels of macroblocks, pixels, or even half-pixels. For example, limiting motion of content from frame to frame to coincide with integer numbers of pixels or even integer number of half-pixels will assist conventional video compression processing that relies on integer pixel or half pixel motion estimation processing.

Inter-Frame Production Constraints: Scene Changes and GOPs

The Background section in this specification described how prior art objective and subjective video compression schemes deal with abrupt scene changes. As described earlier, objective video compression schemes segment an incoming video stream into GOPs for compression processing independent of the location of scene changes within the video stream. Subjective video compression schemes, on the other hand, are able to modify the definitions of GOPs used during video encoding to take into account the actual location of at least some abrupt scene changes within the video stream by varying the size of GOPs by a few frames to align GOP boundaries with frames corresponding to those scene changes.

According to one possible implementation of the present invention, information regarding the desired GOP structure (e.g., GOP size and phasing) for the eventual encoded video bitstream is taken into account during the video production stage to ensure that abrupt scene changes in the uncompressed video stream will be aligned with boundaries between those desired GOPs during the video compression stage. For a specified desired GOP structure (e.g. 16 frames per GOP), the video production stage would keep track of the total number of frames from the beginning of the resulting uncompressed video stream and ensure that the first frame in each new scene corresponds to the first (i.e., I) frame of a GOP. In that way, the advantages of high quality and low bit rate of subjective video compression schemes can be achieved using a less-complex objective video compression algorithm, since scene changes will be guaranteed to coincide with GOP boundaries.

So far, the discussion of scene changes has been limited to cuts, that is, to scene changes that occur abruptly from one frame corresponding entirely to one scene to the next frame, which corresponds entirely to the next scene. The present invention can also be implemented in the context of gradual scene changes, such as fades, wipes, and dissolves, that occur over a number of consecutive video frames. Here, according to one possible implementation of the present invention, both the location and duration of gradual scene changes in the uncompressed video stream generated during video production processing are constrained based on the desired GOP structure for the encoded video bitstream to be generated during video compression processing. If gradual scene changes are constrained to both start and end on GOP boundaries (implying that gradual scene changes are constrained to correspond to an integer number of GOPs), then objective video compression processing will be improved.

Constraining pans and zooms based on block boundaries and constraining abrupt and gradual scene changes based on a desired GOP structure are just a few examples of inter-frame video production constraints that are supported by the present invention. Other types of inter-frame video production constraints based on other types of compression-related information are also possible.

The following section gives examples of the third type of video production constraints—inter-stream constraints—those that apply when two or more different uncompressed video streams are compressed in parallel, for example, for transmission over a single transmission channel.

Inter-Stream Production Constraints: Transmitting Multiple Video Streams over a Single Channel With the advent of technologies that support transmission of video data at higher and higher bandwidths, the possibility exists for transmitting two or more different compressed video bitstreams in parallel on a single transmission channel. For example, terrestrial Digital Television (DTV) channels can support bandwidths as high as about 19 megabits per seconds (Mbps), and cable can support even higher bandwidths of 40 Mbps or more. Instead of transmitting a single High-Definition Television (HDTV) program, a particular DTV channel could be used to transmit a number of different (e.g., MPEG) compressed video bitstreams corresponding to a number of different Standard-Definition Television (SDTV) programs.

At different times, a typical video program consists of different types of video sequences that encode into portions of the compressed bitstream having different bit-rate characteristics. A typical "fast motion" video sequence (in which the imagery changes rapidly) will require a higher average bit rate to encode than a typical "talking head" video sequence (in which most—but not all—of the imagery is substantially static from frame to frame).

Another type of video sequence is an "audio over still" sequence consisting of a single still image with accompanying audio. When encoded using a video compression algorithm that relies on inter-frame encoding techniques, such as an MPEG algorithm, the compressed bitstream for an "audio over still" video sequence would consist of a relatively short burst of relatively high bit rate (corresponding to the introduction of the still image and referred to herein as the "still image portion" of an "audio over still" sequence) with the rest of the corresponding bitstream having a relatively low bit rate (corresponding to the encoding of the audio portion and any bits required to encode the continued presence of the still image using inter-frame encoding techniques and referred to herein as the "audio only" portion of an "audio over still" sequence). A typical "slide show" video program would consist of a series of "audio over still" video sequences pieced together.

By coordinating, during the video production stage, the selection and control of the content across multiple uncompressed video streams corresponding to different programs, the present invention can be used to "pack together" more efficiently a greater number of compressed bitstreams corresponding to such programs, such as SDTV programs, for transmission over a single channel, such as a DTV channel.

Figure 2:
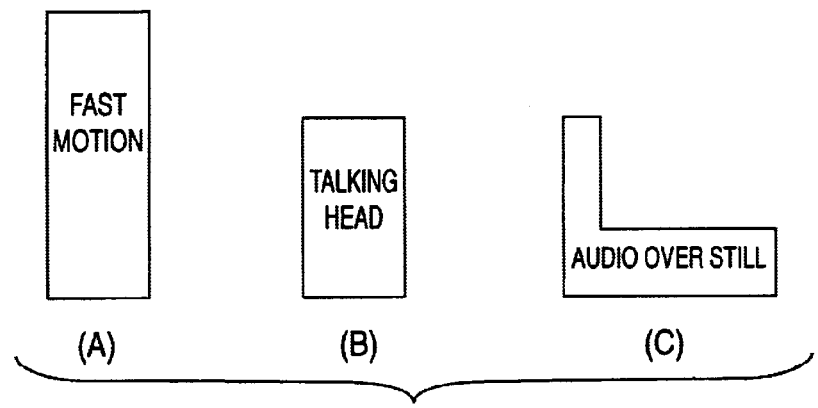
FIGS. 2A–C show exemplary relative bit rates for particular "fast motion," "talking head," and "audio over still" video sequences, respectively.

FIGS. 2A–C show, for illustrative purposes, exemplary idealized relative bit rates for particular "fast motion," "talking head," and "audio over still" video sequences, respectively, where width corresponds to time flowing from left to right, and height corresponds to bit rate. As depicted, the bit rate for the "fast motion" sequence is greater than the bit rate for the "talking head" sequence, while the bit rate at the beginning of the "audio over still" sequence (i.e., when the still image is encoded) is the same as that for the "talking head" sequence, but greater than the bit rate for the rest of the "audio over still" sequence. The present invention can be used to coordinate the selection and control of content across different programs to achieve greater compression efficiency (i.e., lower maximum total bit rate in the combined bitstreams). The general principle is to advantageously orchestrate program segments across several programs in such a way that the bit-demanding, harder-to-encode portions of those programs do not overlap (i.e., coincide in time).

Figure 3:
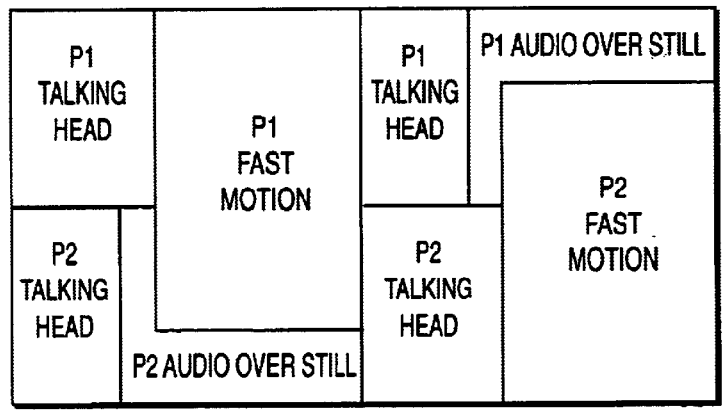
FIG. 3 shows the results of applying the present invention to a coordinate the content of two different programs P1 and P2.

FIG. 3 shows the results of applying the present invention to coordinate the content of two different programs P1 and P2, each of which comprises, at different times, each of the three different types of video sequences shown in FIGS. 2A–C, where the horizontal axis corresponds to time flowing from left to right, and the vertical axis corresponds to bit rate. As shown in FIG. 3, program P1 consists of a "talking head" segment, followed by a "fast motion" segment, followed by another "talking head" segment, followed by an "audio over still" segment. Meanwhile, program P2 consists of a "talking head" segment, followed by an "audio over still" segment, followed by another "talking head" segment, followed by a "fast motion" segment. The types and timing of these different segments are coordinated between the two programs to limit the maximum total instantaneous bit rate for the combined compressed video bitstreams corresponding to the programs. In particular, the following general principle is used to constrain the production of the two programs: A "fast motion" segment in one program must coincide with the "audio only" portion of an "audio over still" segment in the other program. By following this production constraint, the present invention can be used to provide efficient encoding (i.e., limited maximum total bit rate) of two HDTV programs for transmission over a single DTV channel. In general, the present invention can be used to increase the number of programs per channel or improve program quality or a combination of both.

Figure 4:
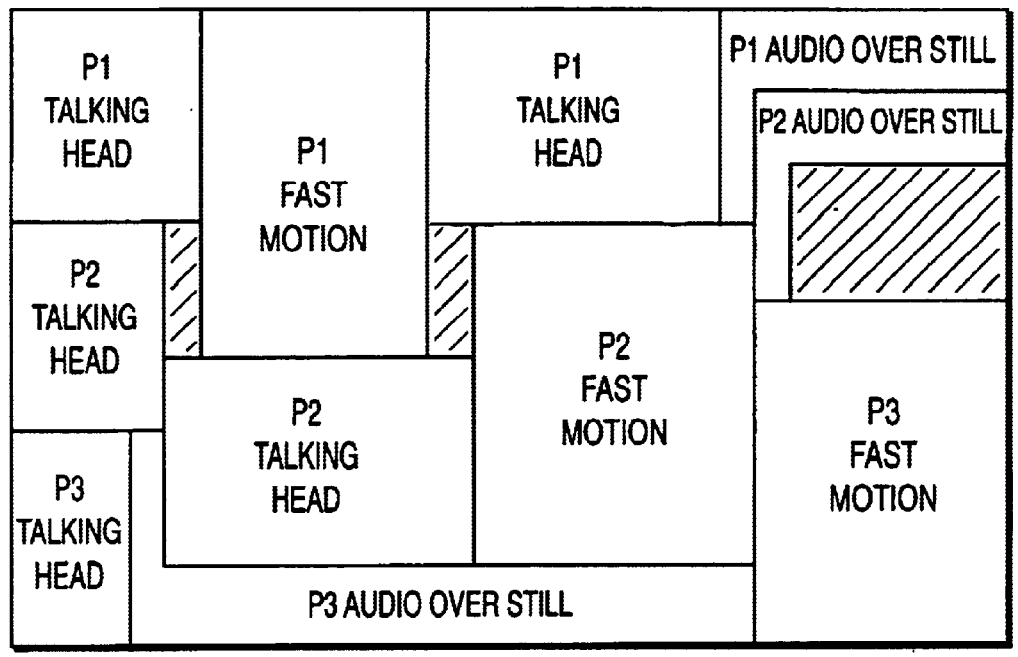
FIG. 4 shows the results of applying the present invention to a coordinate the content of three different programs P1, P2, and P3.

FIG. 4 shows the results of applying the present invention to a coordinate the content of three different programs P1, P2, and P3, each of which comprises, at different times, each of the three different types of video sequences shown in FIGS. 2A–C, where the horizontal axis corresponds to time flowing from left to right, and the vertical axis corresponds to bit rate. As shown in FIG. 4, program P1 consists of a "talking head" segment, followed by a "fast motion" segment, followed by another "talking head" segment, followed by an "audio over still" segment. Meanwhile, program P2 consists of a "talking head" segment, followed by another "talking head" segment, followed by a "fast motion" segment, followed by an "audio over still" segment; and program P3 consists of a "talking head" segment, followed by an "audio over voice" segment, followed by a "fast motion" segment. The types and timing of these different segments are coordinated between the three programs to limit the maximum total instantaneous bit rate for the combined compressed video bitstreams corresponding to the programs. In particular, the following general principles are used to constrain the production of the three programs:

A "fast motion" segment in one program cannot coincide with a "fast motion" segment in any other program; and If one program currently has a "fast motion" segment, then at least one of the other two programs must be in the "audio only" portion of an "audio over still" segment.

By following these two production constraints, the present invention can be used to provide efficient encoding (i.e., limited maximum total bit rate) of three programs for transmission over a single DTV channel.

In FIG. 4, unused portions of available bandwidth are shaded. Depending on the implementation, the compression processing of the different programs could also be coordinated to allocate these unused portions of bandwidth to particular bitstreams to improve the video quality of those segments. Alternatively or in addition, unused portions of bandwidth could be used as opportunistic time slots to send data broadcasts.

Figure 5:
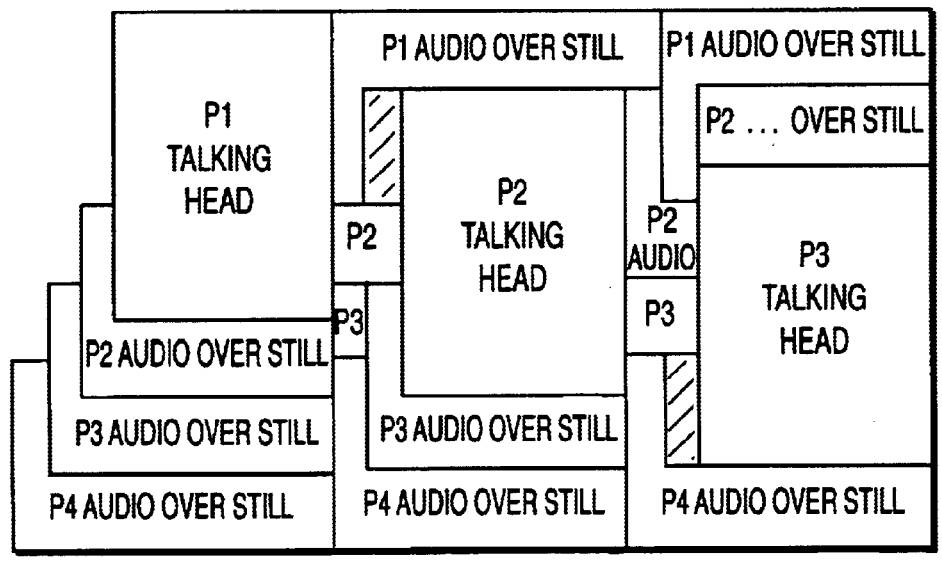
FIG. 5 shows the results of applying the present invention to a coordinate the content of four different programs P1, P2, P3, and P4.

FIG. 5 shows the results of applying the present invention to a coordinate the content of four different programs P1, P2, P3, and P4, each of which comprises, at different times, either a "talking head" sequence or an "audio over still" sequence, where the horizontal axis corresponds to time flowing from left to right, and the vertical axis corresponds to bit rate. As shown in FIG. 5, program P1 consists of a "talking head" segment, followed by two "audio over still" segments in a row. Meanwhile, program P2 consists of an "audio over still" segment, followed by a "talking head" segment, followed by another "audio over still" segment; program P3 consists of two "audio over still" segments in a row, followed by a "talking head" segment; and program P4 consists of three "audio over still" segments in a row. The types and timing of these different segments are coordinated between the four programs to limit the maximum total instantaneous bit rate for the combined compressed video bitstreams corresponding to the programs. In particular, the following general principles are used to constrain the production of the four programs:

A "talking head" segment in one program must coincide with the "audio only" portions of "audio over still" segments in the other three programs; and No more than two programs can have "still image" portions of "audio over still" segments at the same time.

By following these two production constraints, the present invention can be used to provide efficient encoding (i.e., limited maximum total bit rate) of four programs for transmission over a single DTV channel.

Note that, in FIG. 5, in order to illustrate the efficient packing of programs into the available bandwidth, some individual program segments are depicted as multiple non-contiguous regions. For example, for both programs P2 and P3, the end of the initial "audio over still" segment is vertically offset from the beginning of the corresponding segment. Similarly, the end of the last "audio over still" segment in program P2 is vertically offset from the beginning of that segment. Nevertheless, it will be understood that, in each case, those two vertically offset regions correspond to a single "audio over still" video segment.

Figure 6:
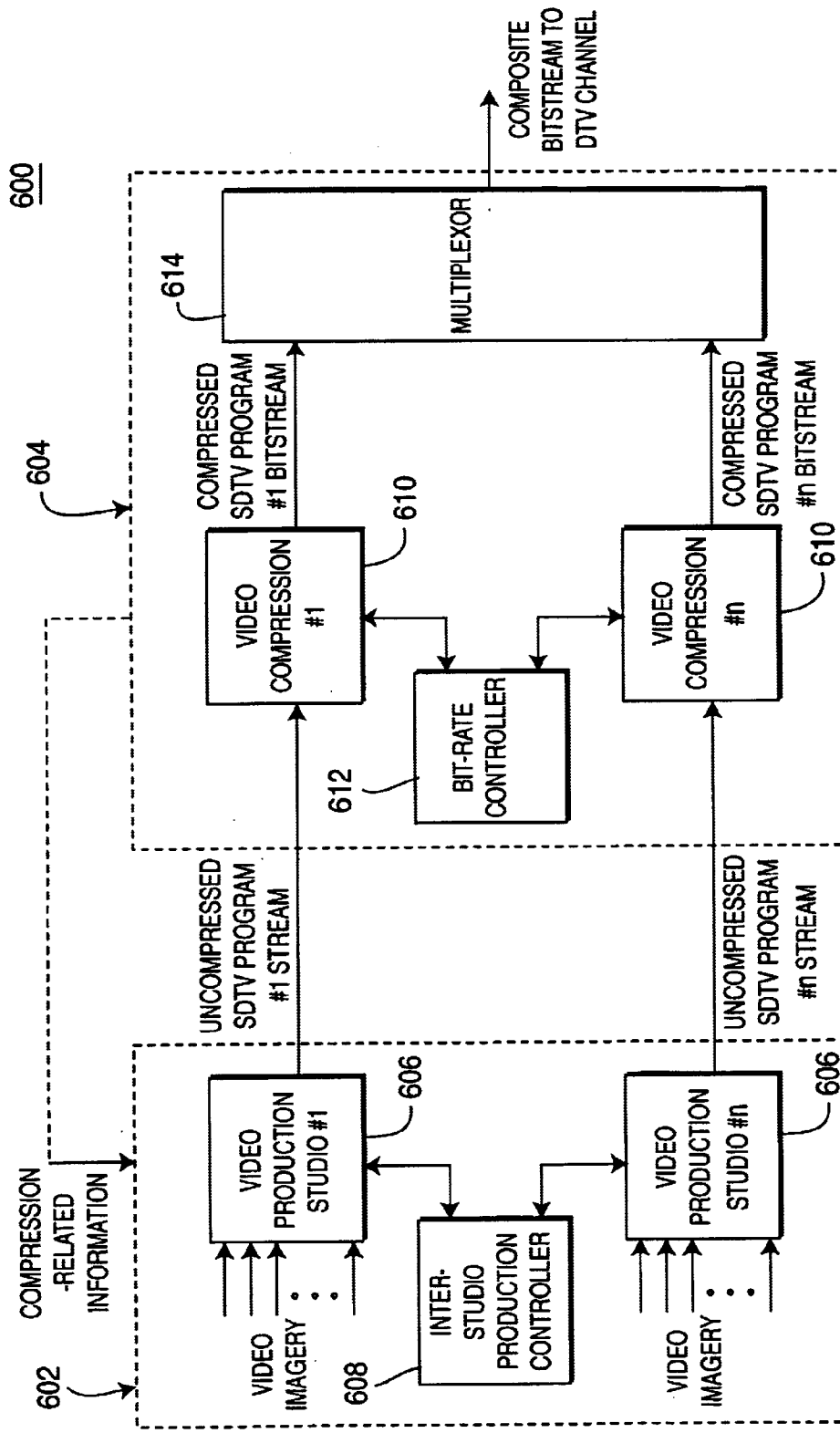
FIG. 6 shows a block diagram of a video processing system that could be used to generate the bitstreams shown in FIGS. 3–5, according to one embodiment of the present invention.

FIG. 6 shows a block diagram of a video processing system 600 that could be used to generate the bitstreams shown in FIGS. 3–5, according to one embodiment of the present invention. Video processing system 600 could be implemented, for example, in a television station that generates different SDTV programs in different studios in (possibly) real time for transmission over a single DTV channel. Like video processing system 100 of FIG. 1, video processing system 600 has a production stage 602 followed by a compression stage 604, where the production stage is constrained based on compression-related information that may be—but does not have to be—dynamically fed back from the compression stage.

Unlike video processing system 100, however, production stage 602 comprises n different video production studios 606 operating (possibly) in parallel under the control of an inter-studio production controller 608 to generate n uncompressed video streams corresponding to n different SDTV programs. Similarly, compression stage 604 comprises n different video compressors 610 operating (possibly) in parallel under the control of a bit-rate controller 612 to compress the n uncompressed video streams into n compressed video bitstreams corresponding to the n SDTV programs. In addition, video compression stage 604 also has a multiplexor (mux) 614, which combines the n compressed video bitstreams into a single composite bitstream (such as those shown in FIGS. 3–5) suitable for transmission over a single DTV channel.

Inter-studio production controller 608 coordinates the selection and control of video imagery by each different production studio 606 to form its corresponding uncompressed SDTV program such that the instantaneous bit rate for the composite bitstream generated by mux 614 will be maintained at an acceptable level. To achieve this goal, production controller 608 takes into account the expected or actual bit rates for compressed bitstreams corresponding to the different sets of video imagery used to form the SDTV programs. Similarly, bit-rate controller 612 controls the allocation of the bandwidth in the DTV channel to the different video compressors 610 based on both bit rate and video quality considerations. For non-real-time content, a set of "rules" can be obeyed as part of multiple program construction and editing using time codes to synchronize segments of different video streams.

Although, in this section, the present invention has been described in the context of compressing multiple SDTV programs using an MPEG compression algorithm for transmission over a single DTV transmission channel, the invention is not so limited. One or more or all of the multiple uncompressed video streams can be other than SDTV programs. In addition or alternatively, one or more or all of the multiple uncompressed video streams can be compressed using algorithms other than an MPEG algorithm. In general, each stream could be compressed using a different compression algorithm, including a different type of MPEG algorithm for each stream. Moreover, the transmission channel can be a suitable channel other than a DTV channel, such as a DVB, DirecTV, ATSC, Internet, Web, or DSL channel.

Furthermore, the multiple uncompressed video streams could be compressed for applications other than transmission in a single channel, such as interactive video applications and interactive switching between multi-camera views and program segments.

Constraining the video content of multiple video streams that are to be compressed and transmitted over a single transmission channel is just one example of inter-stream video production constraints that are supported by the present invention. Other types of inter-stream video production constraints based on other types of compression-related information are also possible. For example, different video streams could have different frame rates (e.g., some at 60 frames per second (fps), some at 30 fps, some at 24 fps). In addition, lower frame rates (e.g., 15, 12, 7½, 6 fps) can be artificially created by frame repeating to allow efficient encoding.

Combining Video Production Constraints

Depending on the application, different numbers and types of production constraints can be applied at the same time during the video production processing. That is, one or more different intraframe, inter-frame, and/or inter-stream production constraints can be applied simultaneously during the video production stage to generate one or more uncompressed video streams for subsequent compression processing.

For example, as described in the previous section, a "slide show" program can be generated by appending a sequence of "audio over still" segments together end to end. In accordance with the present invention, inter-frame video production constraints can be used to generate a "slide show" program such that each new still image in the program coincides with an I frame in the corresponding compressed video bitstream. At the same time, inter-stream video production constraints in accordance with the present invention can be used to stagger two or more such "slide show" programs to pack them together for transmission over a single transmission channel (as suggested by the relative staggering between programs P3 and P4 for the first two "audio over still" segments in each program). Since each video stream is compressed separately during the compression stage, the relative staggering between programs does not affect the fact that, within each video stream, still images coincide with I frames.

Static vs. Adaptive Video Processing

As described earlier with respect to FIG. 1, a video processing system can be implemented to perform either static or adaptive video processing. In static video processing, the compression-related information input to the video production stage is fixed and independent of the compression processing performed in the video compression stage on the actual uncompressed video stream generated by the production stage.

In dynamic video processing, on the other hand, at least some of the compression-related information used to constrain video production processing is based on the actual compression processing of the compression stage and fed back to the production stage. This dynamic video processing can take different forms. In one possible implementation, video production is initiated with minimal (or even no) compression-related constraints applied. As video production and video compression proceed, if the resulting compressed video bitstream is determined to have inadequate quality and/or too high a bit rate, then that information is fed back to the video production stage where one or more constraints can be applied during video production processing. Depending on the application, the newly applied production constraints can be applied to the same incoming sets of video imagery to "re-produce" that portion of the uncompressed video stream or they can be applied only to subsequent sets of video imagery. The process of adjusting the number and type of different constraints can proceed in a dynamic fashion until acceptable levels of video quality and bit rate are achieved.

In addition to adjusting the number and type of constraints during video production processing, some individual production constraints may be able to be applied at different levels of severity. For example, a possible production constraint would be to require every abrupt scene change to occur on a GOP boundary. This same production constraint could be applied with less severity by requiring a specified minimum percentage (e.g., at least half) of abrupt scene changes to occur on a GOP boundary. An adaptive implementation of a video processing system of the present invention, such as systems 100 or 600, could take real-time bit rate and video quality measures into account as feed-back from the video compression stage to adjust dynamically the level of severity of such production constraints.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for producing an uncompressed video stream, comprising the steps of:
    (a) receiving one or more sets of video imagery; and
    (b) generating the uncompressed video stream from the one or more sets of video imagery, wherein selection of content in the uncompressed video stream is constrained based on information relating to potential subsequent video compression processing, wherein the information relating to video compression processing is used to generate one or more inter-frame video production constraints applied during step (b), wherein an inter-frame video production constraint controls the selection of content from frame to frame within the uncompressed video stream.

2. The invention of claim 1, further comprising the step of (c) applying the video compression processing to the uncompressed video stream to generate an encoded video bitstream.

3. The invention of claim 2, wherein at least some of the information relating to the video compression processing is dynamic information fed back from step (c) to step (b) in real time.

4. The invention of claim 3, wherein the dynamic information relating to the video compression processing is used to adaptively change at least one of (i) the number of video production constraints applied during step (b), (ii) the type of at least one video production constraint applied during step (b), and (iii) severity of at least one video production constraint applied during step (b).

5. The invention of claim 2, wherein the video compression processing applies an objective video compression algorithm that does not take into account the content of the uncompressed video stream.

6. The invention of claim 1, wherein the information relating to video compression processing is used to generate one or more intra-frame video production constraints applied during step (b), wherein an intra-frame video production constraint controls the selection of content within a frame of the uncompressed video stream.

7. The invention of claim 6, further comprising the step of (c) applying the video compression processing to the uncompressed video stream to generate an encoded video bitstream.

8. The invention of claim 6, wherein:
the information relating to video compression processing corresponds to dimensions and locations of pixel blocks within the frame of the uncompressed video stream for the video compression processing; and
the intra-frame video production constraint restricts the selection of content within the frame to correspond to block boundaries within the frame.

9. The invention of claim 1, wherein:
the information relating to video compression processing corresponds to dimensions and locations of pixels within consecutive former and latter frames of the uncompressed video stream for the video compression processing; and
the inter-frame video production constraint restricts the selection of certain changes in content from the former frame to the latter frame to correspond to pixel boundaries within the latter frame.

10. The invention of claim 1, wherein:
the information relating to video compression processing corresponds to groups of pictures (GOPs) in the uncompressed video stream, where the first frame in each GOP is to be encoded as an intra-encoded frame by the video compression processing; and
the inter-frame video production constraint restricts the selection of content at GOP boundaries in the uncompressed video stream.

11. The invention of claim 1, wherein:
step (b) comprises the step of producing two or more different uncompressed video streams; and
the information relating to video compression processing is used to generate one or more inter-stream video production constraints applied during step (b), wherein an inter-stream video production constraint controls the selection of content across at least two different uncompressed video streams.

12. The invention of claim 11, further comprising the steps of:
(c) applying the video compression processing to the uncompressed video streams to generate two or more encoded video bitstreams;
(d) combining the two or more encoded video bitstreams into a single composite bitstream; and
(e) transmitting the composite bitstream over a single transmission channel.

13. The invention of claim 11, wherein:
the information relating to video compression processing corresponds to bit rates associated with different types of video imagery; and
the inter-stream video production constraint restricts the selection of content across uncompressed video streams to limit maximum total instantaneous bit rate for all of the video streams.

14. An apparatus for producing an uncompressed video stream, comprising:
(a) means for receiving one or more sets of video imagery; and
(b) means for generating the uncompressed video stream from the one or more sets of video imagery, wherein selection of content in the uncompressed video stream is constrained based on information relating to potential subsequent video compression processing, wherein the information relating to video compression processing is used to generate one or more inter-frame video production constraints applied by means (b) wherein an inter-frame video production constraint controls the selection of content from frame to frame within the uncompressed video stream.

15. A machine-readable medium, having encoded thereon program code, wherein, when the program code is executed by a machine, the machine implements a method for producing an uncompressed video stream, comprising the steps of:
(a) receiving one or more sets of video imagery; and
(b) generating the uncompressed video stream from the one or more sets of video imagery, wherein selection of content in the uncompressed video stream is constrained based on information relating to potential subsequent video compression processing, wherein the information relating to video compression processing is used to generate one or more inter-frame video production constraints applied during step (b), wherein an inter-frame video production constraint controls the selection of content from frame to frame within the uncompressed video stream.

16. A video processing system, comprising:
(1) a video production stage; and
(2) a video compression stage, wherein:
the video production stage is configured to:
(a) receive one or more sets of video imagery; and
(b) generate the uncompressed video stream from the one or more sets of video imagery, wherein selection of content in the uncompressed video stream is constrained based on information relating to potential subsequent video compression processing; and
the video compression stage is configured to apply the video compression processing to the uncompressed video stream to generate an encoded video bitstream, wherein:

the video production stage comprises:
- (1) two or more video production studios, each producing a different uncompressed video stream; and
- (2) a video production controller configured to coordinate operations of the video production studios; and the video compression stage comprises:
- (1) two or more video compressors, each compressing a different uncompressed video stream generated by one of the video production studios into a different compressed video bitstream; and
- (2) a multiplexor configured to combine the different compressed video bitstreams generated by the video compressors into a composite bitstream suitable for transmission over a single transmission channel.

17. The invention of claim 16, wherein the video compression stage further comprises a bit-rate controller configured to allocate bandwidth in the single transmission channel to the different video compressors.

18. A method for producing an uncompressed video stream, comprising the steps of:
- (a) receiving one or more sets of video imagery; and
- (b) generating the uncompressed video stream from the one or more sets of video imagery, wherein selection of content in the uncompressed video stream is constrained based on information relating to potential subsequent video compression processing, wherein the information relating to video compression processing is used to generate one or more intra-frame video production constraints applied during step (b), wherein an intra-frame video production constraint controls the selection of content within a frame of the uncompressed video stream.

19. The invention of claim 18, further comprising the step of (c) applying the video compression processing to the uncompressed video stream to generate an encoded video bitstream.

20. The invention of claim 19, wherein at least some of the information relating to the video compression processing is dynamic information fed back from step (c) to step (b) in real time.

21. The invention of claim 19, wherein the video compression processing applies an objective video compression algorithm that does not take into account the content of the uncompressed video stream.

22. The invention of claim 18, wherein:
the information relating to video compression processing corresponds to dimensions and locations of pixel blocks within the frame of the uncompressed video stream for the video compression processing; and
the intra-frame video production constraint restricts the selection of content within the frame to correspond to block boundaries within the frame.

23. An apparatus for producing an uncompressed video stream, comprising:
- (a) means for receiving one or more sets of video imagery; and
- (b) means for generating the uncompressed video stream from the one or more sets of video imagery, wherein selection of content in the uncompressed video stream is constrained based on information relating to potential subsequent video compression processing, wherein the information relating to video compression processing is used to generate one or more intra-frame video production constraints applied by means (b), wherein an intra-frame video production constraint controls the selection of content within a frame of the uncompressed video stream.

24. The invention of claim 23, wherein:
the information relating to video compression processing corresponds to dimensions and locations of pixel blocks within the frame of the uncompressed video stream for the video compression processing; and
the intra-frame video production constraint restricts the selection of content within the frame to correspond to block boundaries within the frame.

25. A machine-readable medium, having encoded thereon program code, wherein, when the program code is executed by a machine, the machine implements a method for producing an uncompressed video stream, comprising the steps of:
- (a) receiving one or more sets of video imagery; and
- (b) generating the uncompressed video stream from the one or more sets of video imagery, wherein selection of content in the uncompressed video stream is constrained based on information relating to potential subsequent video compression processing, wherein the information relating to video compression processing is used to generate one or more intra-frame video production constraints applied during step (b), wherein an intra-frame video production constraint controls the selection of content within a frame of the uncompressed video stream.

26. The invention of claim 25, wherein:
the information relating to video compression processing corresponds to dimensions and locations of pixel blocks within the frame of the uncompressed video stream for the video compression processing; and
the intra-frame video production constraint restricts the selection of content within the frame to correspond to block boundaries within the frame.

27. A method for producing an uncompressed video stream, comprising the steps of:
- (a) receiving one or more sets of video imagery; and
- (b) generating the uncompressed video stream from the one or more sets of video imagery, wherein selection of content in the uncompressed video stream is constrained based on information relating to potential subsequent video compression processing, wherein:
  step (b) comprises the step of producing two or more different uncompressed video streams; and
  the information relating to video compression processing is used to generate one or more inter-stream video production constraints applied during step (b), wherein an inter-stream video production constraint controls the selection of content across at least two different uncompressed video streams.

28. The invention of claim 27, further comprising the steps of:
- (c) applying the video compression processing to the uncompressed video streams to generate two or more encoded video bitstreams;
- (d) combining the two or more encoded video bitstreams into a single composite bitstream; and
- (e) transmitting the composite bitstream over a single transmission channel.

29. The invention of claim 28, wherein at least some of the information relating to the video compression processing is dynamic information fed back from step (c) to step (b) in real time.

30. The invention of claim 28, wherein the video compression processing applies an objective video compression algorithm that does not take into account the content of the uncompressed video stream.

31. The invention of claim 27, wherein:

the information relating to video compression processing corresponds to bit rates associated with different types of video imagery; and the inter-stream video production constraint restricts the selection of content across uncompressed video streams to limit maximum total instantaneous bit rate for all of the video streams.

32. An apparatus for producing an uncompressed video stream, comprising:

(a) means for receiving one or more sets of video imagery; and (b) means for generating the uncompressed video stream from the one or more sets of video imagery, wherein selection of content in the uncompressed video stream is constrained based on information relating to potential subsequent video compression processing, wherein:

means (b) is adapted to produce two or more different uncompressed video streams; and the information relating to video compression processing is used to generate one or more inter-stream video production constraints applied by means (b), wherein an inter-stream video production constraint controls the selection of content across at least two different uncompressed video streams.

33. The invention of claim 32, wherein:

the information relating to video compression processing corresponds to bit rates associated with different types of video imagery; and the inter-stream video production constraint restricts the selection of content across uncompressed video streams to limit maximum total instantaneous bit rate for all of the video streams.

34. A machine-readable medium, having encoded thereon program code, wherein, when the program code is executed by a machine, the machine implements a method for producing an uncompressed video stream, comprising the steps of:

(a) receiving one or more sets of video imagery; and (b) generating the uncompressed video stream from the one or more sets of video imagery, wherein selection of content in the uncompressed video stream is constrained based on information relating to potential subsequent video compression processing, wherein:

step (b) comprises the step of producing two or more different uncompressed video streams; and the information relating to video compression processing is used to generate one or more inter-stream video production constraints applied during step (b), wherein an inter-stream video production constraint controls the selection of content across at least two different uncompressed video streams.

35. The invention of claim 34, wherein:

the information relating to video compression processing corresponds to bit rates associated with different types of video imagery; and the inter-stream video production constraint restricts the selection of content across uncompressed video streams to limit maximum total instantaneous bit rate for all of the video streams.

* * * * *